(12) United States Patent
Boyd

(10) Patent No.: US 7,860,752 B2
(45) Date of Patent: Dec. 28, 2010

(54) SYSTEM AND METHOD FOR MEASURING REPUTATION USING TAKE VOLUME

(75) Inventor: Mark J. Boyd, Mountain View, CA (US)

(73) Assignee: eBay Inc., San Jose, CA (US)

( * ) Notice: Subject to any disclaimer, the term of this patent is extended or adjusted under 35 U.S.C. 154(b) by 990 days.

(21) Appl. No.: 11/644,544

(22) Filed: Dec. 22, 2006

(65) Prior Publication Data
US 2008/0059215 A1    Mar. 6, 2008

Related U.S. Application Data

(60) Provisional application No. 60/823,923, filed on Aug. 30, 2006.

(51) Int. Cl.
*G06Q 30/00* (2006.01)
(52) U.S. Cl. .................. 705/26; 705/1; 705/27
(58) Field of Classification Search .................. 705/26, 705/27, 1
See application file for complete search history.

(56) References Cited

U.S. PATENT DOCUMENTS

| | | | |
|---|---|---|---|
| 5,905,974 A | 5/1999 | Fraser et al. | |
| 6,336,105 B1 | 1/2002 | Conklin et al. | |
| 6,519,571 B1 | 2/2003 | Guheen et al. | |
| 6,598,026 B1 | 7/2003 | Ojha et al. | |
| 7,085,740 B1 | 8/2006 | Meyers | |
| 7,103,565 B1 | 9/2006 | Vaid | |
| 7,209,895 B2* | 4/2007 | Kundtz et al. | 705/26 |
| 7,231,353 B1* | 6/2007 | Goyal | 705/1 |
| 7,587,367 B2* | 9/2009 | Mengerink | 705/64 |
| 2001/0032170 A1 | 10/2001 | Sheth | |
| 2002/0095328 A1 | 7/2002 | Swart et al. | |
| 2002/0138402 A1* | 9/2002 | Zacharia et al. | 705/37 |
| 2005/0080709 A1 | 4/2005 | Guler et al. | |
| 2006/0009994 A1* | 1/2006 | Hogg et al. | 705/1 |
| 2007/0179845 A1* | 8/2007 | Jain | 705/14 |

FOREIGN PATENT DOCUMENTS

GB    2382162 A    5/2003

OTHER PUBLICATIONS

Dellarocas, Chrysanthos, "Reputation Mechanism Design in Online Trading Environments with Pure Moral Hazard," Information Systems Research, vol. 16, No. 2, Jun. 2005, pp. 209-230 (retrieved on Nov. 24, 2009).*

(Continued)

*Primary Examiner*—Yogesh C Garg
*Assistant Examiner*—Anne M Georgalas
(74) *Attorney, Agent, or Firm*—Schwegman, Lundberg & Woessner, P.A.

(57) ABSTRACT

This document describes, among other things, systems and methods for measuring reputation using take volume. A method comprises determining a take amount related to a transaction in which a user participated; accumulating the take amount with a total take amount accumulated from one or more other transactions; determining feedback related to the transaction; accumulating the take amount with a total positive take amount when the feedback is positive feedback; and including the total positive take amount in reputation information related to the user.

22 Claims, 4 Drawing Sheets

OTHER PUBLICATIONS

Dellarocas, Chrysanthos, "The Digitization of Word of Mouth: Promise and Challenges of Online Feedback Mechanisms," Management Science, vol. 49, No. 10, Oct. 2003, pp. 1407-1424 (retrieved on Nov. 24, 2009).*

Brown, Jennifer, et al., "Reputation in Online Markets: Some Negative Feedback", *Working Paper*, University of California, Berkeley, (Feb. 2006), 1-31.

* cited by examiner

| | NUMBER | VOLUME | TAKE VOLUME |
|---|---|---|---|
| POSITIVE VALUE | 100 | $1 x 100 | $.10 |
| NEGATIVE VALUE | 1 | $100 x 1 | $11 |
| TOTAL VALUE | 101 | $200 | $21 |
| % POSITIVE | 99% | 50% | 47.6% |

SYSTEM AND METHOD FOR MEASURING REPUTATION USING TAKE VOLUME

CROSS-REFERENCE TO RELATED PATENT DOCUMENTS

This patent application claims the benefit of priority, under 35 U.S.C. Section 119(e), to Boyd, U.S. Provisional Patent Application Ser. No. 60/823,923, entitled "System and Method for Measuring Reputation Using Take Volume," filed on Aug. 30, 2006, the contents of which are hereby incorporated by reference in its entirety.

TECHNICAL FIELD

Embodiments relate generally to the field of data-processing, and more specifically to methods and systems that measure reputation using take volume.

BACKGROUND

More and more Internet users are realizing the ease and convenience of purchasing products and services through online catalogs, which are provided by network-based commerce systems. Catalog entries for various products and services may be presented to a user when the user computer interacts with a network-based commerce system, downloads catalog entry information, and displays the catalog entries on the computer's monitor via a user interface (e.g., one or more web pages). The user may then interact with the user interface to purchase the products and/or services. As a result of interactions, the user may gain a reputation. Properly tracking, maintaining, and providing an accurate representation of a user's reputation is important to allow other users to evaluate the honesty and trustworthiness of the user.

DETAILED DESCRIPTION

Methods and systems to measure and track reputations using take volume are described. In the following description, for purposes of explanation, numerous specific details are set forth in order to provide a thorough understanding of embodiments. It will be evident, however, to one skilled in the art that embodiments may be practiced without these specific details.

Figures 1, 2:
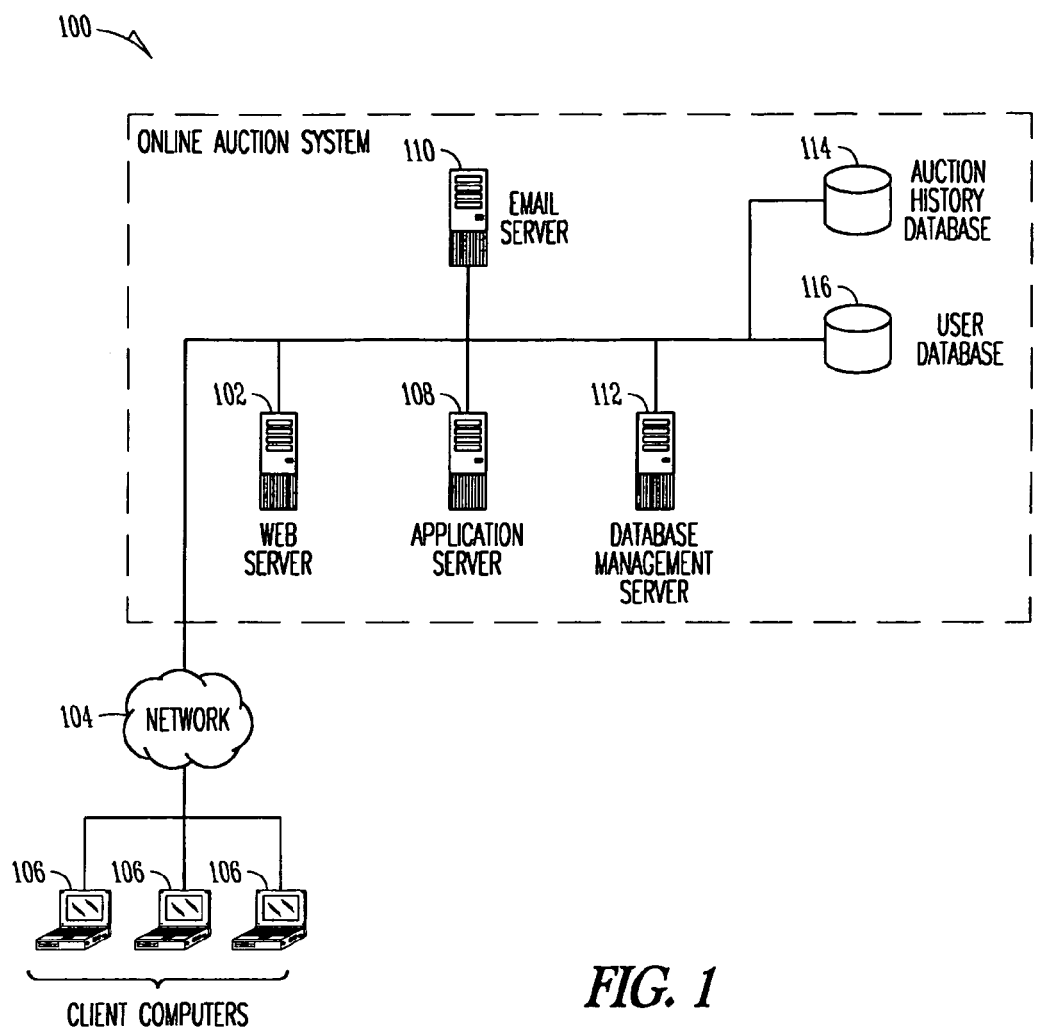
FIG. 1 is a schematic block diagram illustrating an online auction system in accordance with an example embodiment.
FIG. 2 is a table illustrating various example methods of determining reputation.

FIG. 1 is a schematic block diagram illustrating an online auction system 100 (e.g., an advertising system) in accordance with an example embodiment. While example embodiments are described within the context of the online auction system 100, embodiments may find application in many different types of computer-based or network-based facilities or systems (e.g., publication system or advertising system). Additionally, methods described may be utilized at auctions or commerce performed offline, such as at a live auction house. Accordingly, the example embodiment of an online auction system 100 is not intended to limit the scope solely to such systems.

In an embodiment, the online auction system 100 includes a web server 102, which can communicate over a network 104 to a client computer 106. The web server 102 additionally can communicate using one or more direct or networked connections with other servers, such as an application server 108, an email server 110, and a database management server 112. In addition, an auction history database 114 and a user database 116 are communicatively coupled to the network 104.

In an embodiment, the online auction system 100 is accessed by a client program, for example a browser (e.g., Internet Explorer® distributed by Microsoft® Corp. of Redmond, Wash.) that executes on the client computer 106 and accesses the online auction system 100 via the network 104. In various embodiments, the network 104 may include the Internet, a wide area network (WAN), a local area network (LAN), a wireless network (e.g., a cellular network), the Public Switched Telephone Network (PSTN) network, or the like.

In some embodiments, the auction history database 114 and the user database 116 are located on the same database server (not shown). In an embodiment, either of the databases 114, 116 may be configured as distributed databases. In an alternative embodiment, the databases 114, 116 may be implemented as collections of objects in an object-oriented database. In addition, some of the information contained in one database may also exist in another database, for example by using shared tables, automation, or the like. The databases 114, 116 can, in some embodiments, be implemented as relational databases, and can include a number of tables having entries, or records, that are linked by indices and keys relating tables or records within one database or across several databases.

In an embodiment, the user database 116 includes information in one or more tables related to users of the online auction system 100 (e.g., buyers or sellers). In addition to general information, such as name, online identity, billing information, and shipping information, the user database 116 may also include data that forms one or more reputation indications or scores.

In an embodiment, the auction history database 114 contains information in one or more tables related to auctions that a user has participated in. For example, the auction history database 114 may be structured to include some or all of the following information: a product identifier, a time and date of sale, a time and date of an initial offering of sale, a selling party, a purchasing party, a sale price, a quantity, or a feedback indicator. Additional information may be captured to document a user's usage of the online auction system 100.

During operation, in an embodiment, a first user (seller) at a client machine 106 can create an auction listing. The auction listing may be for a product or service that the user wishes to sell. Details such as the price, description, minimum bid price, reserve price, auction type, photos, listing style or appearance, and the like are provided by the user and stored in the auction history database 114. A second user (buyer) using a client machine 106 may then connect with the online auction system 100 and bid on the product or service listed. If the second user wins the auction, such as by being the high bidder or bidding a buyout price, the sale is recorded in the auction history database 114. After the sale is consummated, the selling user has the obligation to deliver the goods or perform the service that was the subject of the auction while the buying user has the obligation to pay for said goods or services. In an embodiment of an online auction system 100, the selling user and the buying user may leave feedback for the other. Feedback, in one embodiment, may be in the form of "positive" or "negative" and may be made available to other users of the online auction system 100 to provide an indication of the buyer's or the seller's reputation. For example, if both the selling user and the buying user perform without issues arising, then each user may leave a "positive" feedback for the other. However, if one or the other users fails to perform their obligation, then the non-breaching user may leave a "negative" feedback for the breaching user. In some embodiments, feedback is represented using a graduated scale, such as a numeric indication from one to ten, a graphical indication from "one star" to "five stars" or a stepped indication, such as "good," "bad," and "neutral." Positive and negative feedback in such embodiments may be scaled according to the graduated scale used. In an embodiment, feedback is recorded in the user database 116 to be aggregated and presented to other users.

In some examples, feedback may use the "take" associated with one or more transactions in an online auction system. Online auction systems 100 facilitate the buying, selling, listing, and payment transactions for goods and services. To generate revenue, one or more modes may be used. In an embodiment, revenue generated by a sales facilitator (e.g., a marketplace such as the online auction system 100) associated with a sales transaction (e.g., where the price was established using an auction as a price setting mechanism) is referred to as the "take."

For example, the online auction system 100 may charge a listing fee to list the good or service for sale. A listing or insertion fee may include a cost of listing an item based on the type, price, or class of item; auction style or format fees (e.g., fees for italic, bold, or underlining text in a listing); featured item status or other promotional fees; advertisement fees; insurance premiums; or fees for a reserve price, buyout price, auction duration or other auction characteristics.

Some or all of the take revenue may be related to the sale price. For example, the online auction system 100 may withhold an amount of the sale price as the auction system's commission on a sale. The commission may be a straight percentage of the sale price or may be some sliding or stepped scale related to the sale price. For example, the sales commission may be a stepwise function based on the sale price, for example, 10% for the first $10, 7% up to $25, 5% up to $100, and 3% for anything over $100. Using such a function, an item selling for $55 would have an associated take of $3.55 ($1 for 10% of the first $10, $1.05 for the next $15 at 7%, and $1.50 for the next $30 at 5%). In other cases, the take may be a straight percentage, which may be based on the final sale price and may include a listing fee. For example, items that sell for $10 or less may be charged 10% commission; items that sell for $100 or less may be charged 11%; and items that sell for over $100 may be charged 12.5%. These commission percentages may be in addition to listing fees or other fees.

In some cases, the online auction system 100 may charge a flat fee or commission regardless of the listing price or the sale price of the good or service. The fee may be charged at the time of listing or at the time of sale. The fee may be referred to as a service charge, base fee, handling fee, or the like. In some examples, a flat fee may be in addition to a commission on sale.

In an example, the combined total of fees and commissions for a particular auction make up the take. In another example, one or more fees and/or one or more commissions, which may be a subset of all fees or commissions, are used to calculate the take.

FIG. 2 is a table illustrating various example methods of determining reputation. In particular, examples of calculating a positive reputation score based on the number of transactions 200, the volume of transactions 202, or the take volume 204 are depicted. A positive reputation based on the number of transactions 200 can be determined by dividing the number of positive transactions by the total number of transactions. In this example, there are one hundred positive values (e.g., transactions) and one hundred and one total transactions, so the percent positive score (e.g., positive reputation) is 99%.

Another way of determining positive reputation is by using the volume of positive transactions 202 as measured in currency (e.g., U.S. dollars). Using such a system may account for shill transactions of very small amounts, which would artificially inflate a positive reputation score using the number of transactions 200 technique. As illustrated, if the one hundred positive transactions were for $1 each, then the total positive volume as measured in dollars is $100. Then, if a negative transaction with a high dollar amount, such as $100, was found, the impact would be much greater on the total positive reputation. In this example, the one hundred positive small transactions are offset by the one large negative one, such that the percent positive score (e.g., positive reputation) is reduced to 50%.

While using a volume of positive transactions 202 as measured in currency may provide a more accurate means of calculating a true positive reputation, cunning users may still find ways to circumvent such a system. For example, buyers and sellers may "trade" positive feedback by purporting to sell a high-value item and then never collecting the money. In auction systems that do not have a take or do not use take as a component of reputation, there is no deterrence to such a scam because the fictitious seller is never charged a fee, which in a take-based system would be relatively large in light of the high-value of the fake items.

Take volume reputation 204 measures the amount received by the auction provider and associates it with either positive or negative feedback. In the example shown in FIG. 2, a larger take is associated with a higher-priced item. For the lower-priced items, using a take of 10% of the sale price, the positive value of the transactions shown is $1×100×0.10=$10. For the higher-priced item, the single $100 item, the take is $11. In some embodiments, the larger take is accounted for by a higher percentage of commission related to the higher-priced item (e.g., 11%). In other embodiments, the larger take is accounted for because of one or more fees, such as a listing fee (e.g., $1) or other value-added fee (e.g., featured item status, additional photos for the listing, or font changes to highlight the listing), and a flat percentage commission (e.g., 10%), such that the percentage is the same as the lower-priced items, but the fees increase the total take.

In various embodiments, an auction system may calculate take using one or more of a commission, a listing fee, an advertising fee, or other fees associated with a transaction. The auction system may also use one or more parameters in its calculation of take, such as the type of product or service sold, the origin of the product or service, the forum where the product or service was sold, or other characteristics of the subject of the auction. Take may also be calculated in other ways and is not limited to the examples described herein.

Figure 3:
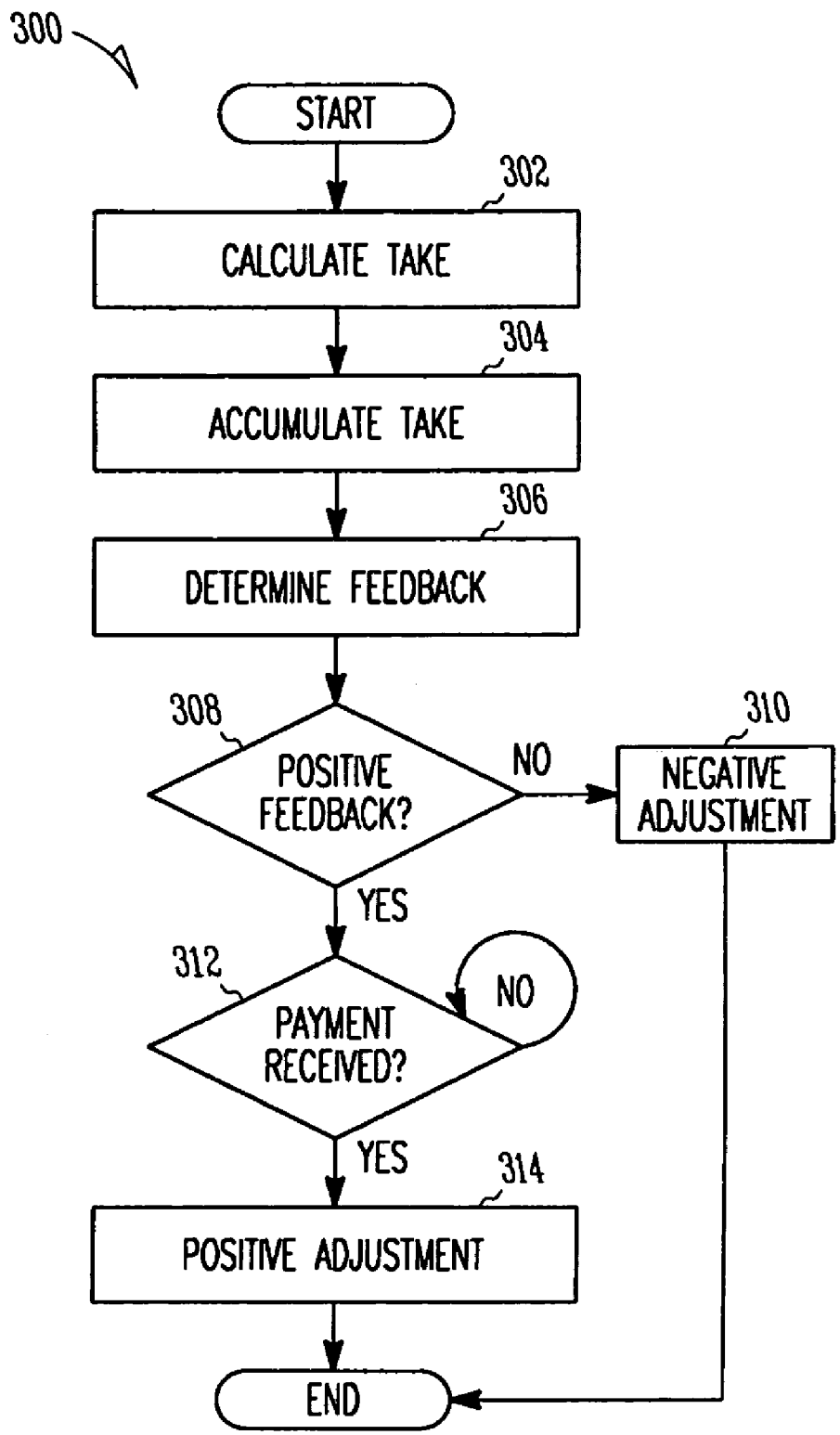
FIG. 3 is a flowchart illustrating a method for determining reputation of a user of an online auction system in accordance with an example embodiment.

FIG. 3 is a flowchart illustrating a method 300 for determining reputation of a user of an online auction system in accordance with an example embodiment. The method 300 begins at block 302 by calculating the take of a transaction. In embodiments, take is calculated by various means as described above.

At 304, the calculated take is accumulated. In one embodiment, as a seller builds up a sales history or as a buyer builds up a buying history, the take associated with a transaction is aggregated into a total take amount. The total take amount may be accumulated over a user account's lifetime, or it may be accumulated based on a portion of the account life, such as by using a three or six month window, in various embodiments. In an embodiment, the aggregation of take is a weighted function. In various examples, the weighted function is a function of time (e.g., take volume associated with newer feedback is weighted differently than take volume associated with older feedback), a function of a number of transactions (e.g., take volume associated with the nth oldest transaction is weighted by 1/n); a function of the origin of a product or service (e.g., take volume from an "electronic" category in an online auction system is weighted differently than take volume from a "collectibles" category in the online auction system, or take volume from one corporate subsidiary is weighted differently than take volume from another corporate subsidiary), or a function of the type of a product or service (e.g., take volume from a sale of a good is weighted differently than take volume from a sale of a service). Weights may be distributed to form a linear, logarithmic, or other mathematically sound function. In some embodiments, two or more aspects of the take are used to determine weights in a weighted function. For example, the origin of the sold product or service and the time of the sale may be used in conjunction, such as by multiplying the two weights associated with a particular transaction together, to determine weights in the function when calculating the aggregated take amount.

At 306, a feedback is determined. In an embodiment, the feedback may include a positive or negative indication. In an example, a user (e.g., buyer or seller) may leave feedback for the other, such as by using a browser on a client computer 106. The feedback is recorded in some embodiments, such as in user database 116 of the online auction system 100.

At 308, it is determined whether the feedback is positive or negative. If the feedback is negative, then the user's reputation is adjusted at 310. In an embodiment, the user's reputation is adjusted immediately upon receiving the negative feedback. For example, after selling an item, a take is calculated (such as at block 302) and a user's account is charged the amount of the take. However, it may be several days or weeks before payment on the charge is due or paid. Thus, the auction house or online auction system may not have received actual payment of the take from the seller by the time the feedback is received. When a negative feedback is received, it may be preferable to provide an immediate indication of such negative feedback to other users of the online auction system 100. So, at block 310, in one embodiment, after receiving negative feedback related to a transaction, the calculated take associated with the transaction is used to determine the user's adjusted reputation and may be made available for other users of the online auction system 100.

At 312, in order to prevent shilling or other fraud, when a positive feedback is determined a second check is performed to determine whether a related outstanding take payment has been received. In an embodiment, the positive feedback is not reflected in the user's reputation until the take payment has been received by the online auction system. In an embodiment, if a user's reputation is sufficiently high and there is little chance that the user would default on the take payment due, then positive feedback may be reflected before the receipt of the take payment. In another embodiment, when the user has made a commitment to pay the take, such as by having the take charged to a credit card and receiving payment from the credit card company, then the take payment may be considered received by the online auction system and the method 300 may continue.

At 314, when the take payment has been received the user's reputation is updated to reflect the positive feedback. In an embodiment, the user's reputation is calculated as the take volume associated with positive buyer feedback divided by the total take volume.

In embodiments, take volume may be used independently or in combination with other indications of reputation. For example, take volume reputation may be presented along with a reputation based on the number of transactions (e.g., 200 in FIG. 2) to expose more information to potential buyers and help them evaluate sellers' reputations. As another example, take volume reputation may be presented along with the number of positive transactions that were used to calculate the take volume reputation. As another example, take volume reputation may be presented using a graduated scale. For quick reference and easier understanding, the graduated scale may be shown using a graphical indication (e.g., a number of stars, or a color or shape of a graphical icon), a numeric indication (e.g., a score out of ten), or a textual indication (e.g., "good," "better," "best"). The output may have granular scales too, such as 5 stars for 99.5% in all areas of feedback, 4 stars for 99%, 3 stars for 98%, 2 stars for 96%, 1 star for 90%, 0 stars for less than 90%, as an example. As another example, various stars (or star colors) may be used to represent various volumes of sales. As another example, a seller with a high reputation may be associated with automatic buyer protection programs or other indicia of approval by the online auction system 100.

In addition, online auction systems 100 can use take volume reputation in other uses, such as to identify reputable sellers and provide placement preference (e.g., in a featured sellers portion of the system), preferential sorting order (e.g., at the top of a list of auctions), as a finer-grained decider of what transactions qualify for transaction protections (e.g., buyer or seller insurance), or for surfacing ads on external sites.

In some embodiments, the subject matter of an auction may be paid for over time. For example, an auctioned license may allow a user to use software for a particular time period and include periodic payments to maintain the user's right of use. If a user breaches the contract, such as by reselling the software or providing access codes, then a portion of any negative feedback may be weighted as a function of the remaining time in the contract. As an example, a user who obtains a license for three years may receive positive feedback based on the take volume of the entire contract. If the user violates the license by reselling the item after two years, after negative feedback is obtained one-third of the reputation may be recalculated by the online auction system 100.

Figure 4:
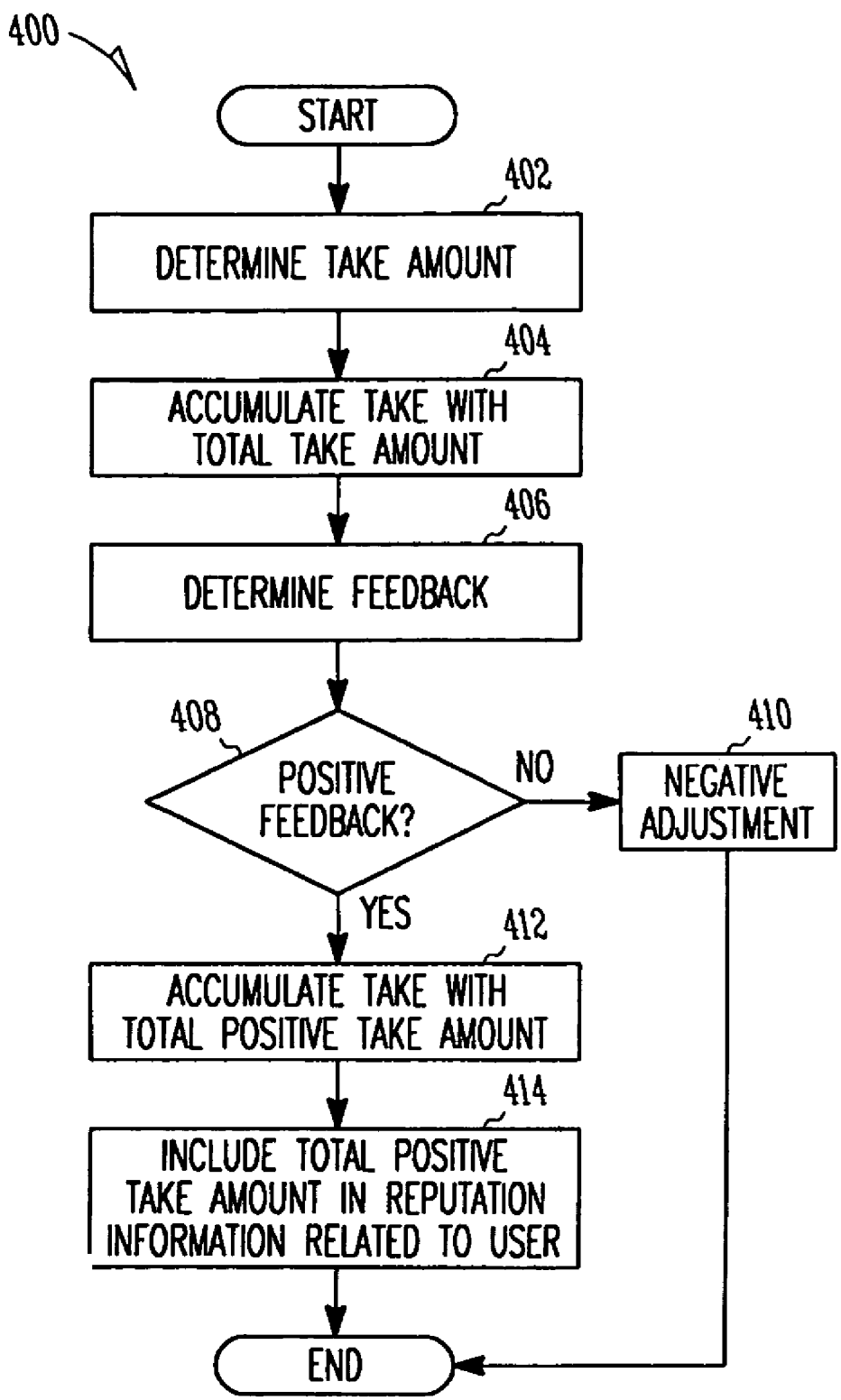
FIG. 4 is a flowchart illustrating a method for determining reputation of a user of an online auction system in accordance with an example embodiment.

FIG. 4 is a flowchart illustrating a method 400 for determining reputation of a user of an online auction system in accordance with an example embodiment. The method 400 begins at block 402 by calculating the take of a transaction. In embodiments, take is calculated by various means as described above.

At 404, the calculated take is accumulated into a total take amount. In an embodiment, users of an online auction system 100 may generate and aggregate take during a user account's lifetime. The total take amount may be accumulated over a user account's lifetime, or it may be accumulated based on a portion of the account life, such as by using a three or six month window, in various embodiments. In embodiments, as described above, the aggregation of take may include using a weighted function, where the weighted function is a function of one or more parameters, such as time, transactions, product origin, or other characteristics of the user's auctions or products. In addition, the weighted function may be a function of two or more such characteristics.

At 406, a feedback related to the transaction is determined. The feedback may include a positive or negative feedback in an embodiment. Feedback may be in the form of other scales, such as a numerical scale (e.g., 1 out of 10) or a graphical scale.

At 408, the feedback is analyzed to determine whether it is positive. If the feedback is not positive, then the user's reputation is adjusted at 410. In an embodiment, the adjustment may occur immediately after such a determination, as described above, to warn other users of potential danger when transacting with the user that received the negative feedback.

At 412, the take amount is accumulated with a total positive take amount. Similar to the total take amount, the total positive take amount may be accumulated over a user account's lifetime, or it may be accumulated based on a portion of the account life, such as by using a three or six month window, in various embodiments. Additionally, in embodiments, the aggregation of total positive take amount may include using a weighted function, where the weighted function is a function of one or more parameters, such as time, transactions, product origin, or other characteristics of the user's auctions or products.

At 414, the total positive take amount is included in the reputation information related to the user. For example, the total positive take amount may be displayed on a reputation user interface to assist other users when evaluating the character of the reviewed user. The total positive take amount may be used to indicate reputation directly, or be used as a component when determining a reputation indicia (e.g., score or label), in embodiments. For example, a user's reputation may be determined by multiple factors, such as total positive take amount in relation to total take amount; the number of transactions that a user has participated in; the age of the user's account; the consistency of making payments to the provider of the online auction system 100; the age, gender, educational or other characteristics of the user; or the like. As another example, the user's reputation may be solely based on the total positive take amount, such as by presenting the amount itself or by presenting a ratio of the total positive take compared to the total take.

Using take volume instead of gross sales volume or a simple indication of positive or negative feedback may have several advantages. First, using take volume encourages honest transactions because actual money must be accounted for before a positive adjustment to a seller's reputation is made, thus sellers may be less likely to engage in volume shills using high-priced items.

Second, using take volume may allow for easier detection of some models of fraud. For example, in a breakout fraud model, a seller sells a number of items at a relatively low price and performs without issue. The seller then attempts to sell a high-priced item with the intent of never shipping or performing. When a system uses a method based on the number of transactions to determine a positive reputation (FIG. 2 at 200), the seller is less concerned about the possibility of negative feedback of the sham sale because of the minimal impact on the reputation (as illustrated with respect to FIG. 2). However, using take volume, negative feedback of a high-value transaction will impact the seller's reputation proportionately more and may dissuade the seller from attempting to perform such a fraud or at least provide a better indication to other potential buyers of the type or existence of fraud.

Third, using take volume may provide an "apples to apples" comparison. For example, take volume calculations may be consistent within a particular market, such that when comparing sellers in the same market or geography, a buyer may confidently assess the sellers' reputations knowing that they are using the same take model.

Figure 5:
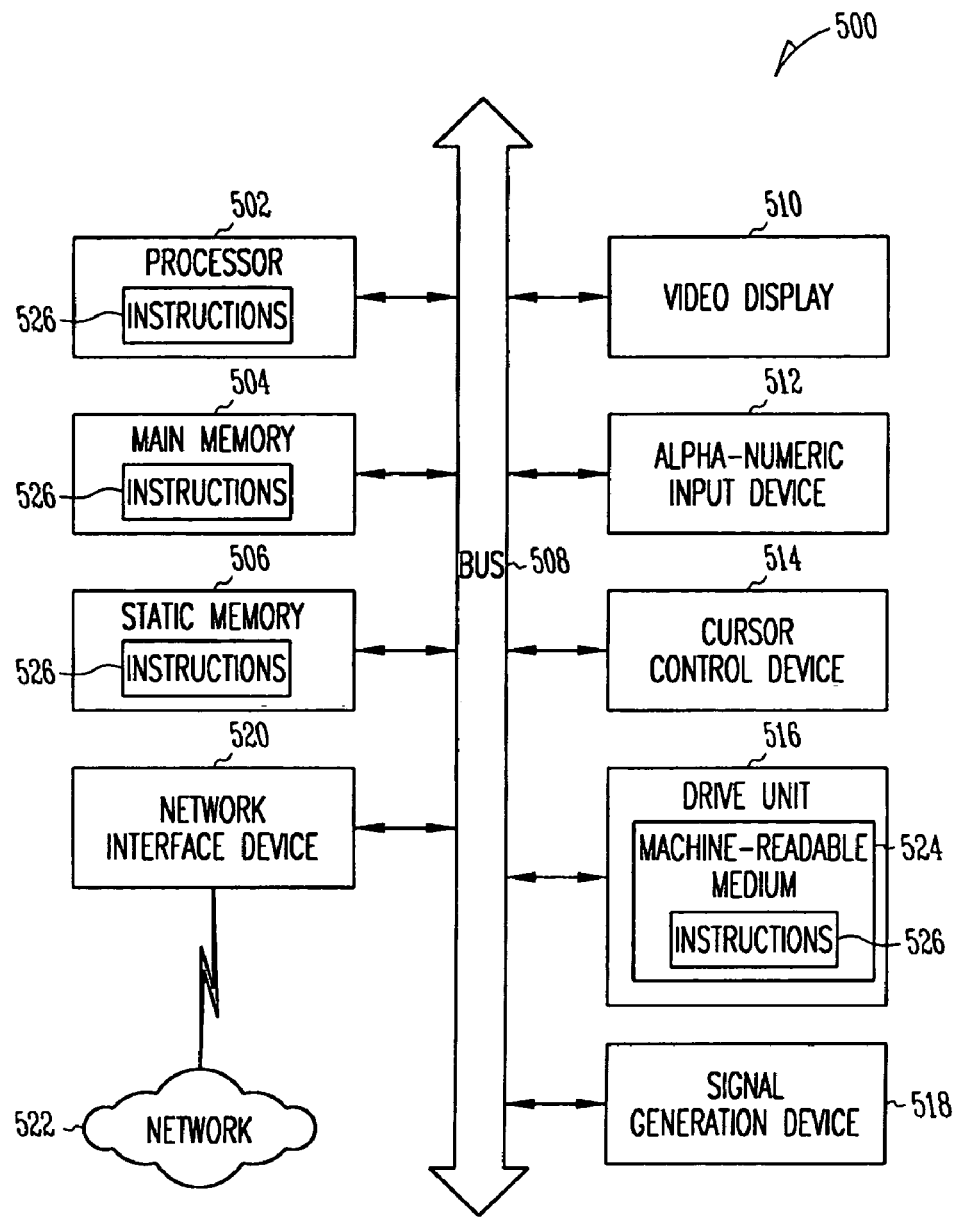
FIG. 5 is a block diagram illustrating a machine in the example form of a computer system, within which a set or sequence of instructions for causing the machine to perform any one of the methodologies discussed herein may be executed.

FIG. 5 is a block diagram illustrating a machine in the example form of a computer system 500, within which a set or sequence of instructions for causing the machine to perform any one of the methodologies discussed herein may be executed. In alternative embodiments, the machine may comprise a computer, a network router, a network switch, a network bridge, Personal Digital Assistant (PDA), a cellular telephone, a web appliance, set-top box (STB) or any machine capable of executing a sequence of instructions that specify actions to be taken by that machine.

The computer system 500 includes a processor 502, a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, a signal generation device 518 (e.g., a speaker) and a network interface device 520 to interface the computer system to a network 522.

The disk drive unit 516 includes a machine-readable medium 524 on which is stored a set of instructions or software 526 embodying any one, or all, of the methodologies described herein. The software 526 is also shown to reside, completely or at least partially, within the main memory 504 and/or within the processor 502. The software 526 may further be transmitted or received via the network interface device 520. For the purposes of this specification, the term "machine-readable medium" shall be taken to include any medium which is capable of storing or encoding a sequence of instructions for execution by the machine and that cause the machine to perform any one of the methodologies. The term "machine-readable medium" shall accordingly be taken to include, but not be limited to, solid-state memories, optical disks, and magnetic disks. Further, while the software is shown in FIG. 5 to reside within a single device, it will be appreciated that the software could be distributed across multiple machines or storage media, which may include the machine-readable medium.

The foregoing description of specific embodiments reveals the general nature sufficiently that others can, by applying current knowledge, readily modify and/or adapt it for various applications without departing from the generic concept. Therefore, such adaptations and modifications are within the meaning and range of equivalents of the disclosed embodiments. The phraseology or terminology employed herein is for the purpose of description and not of limitation. Accordingly, the description embraces all such alternatives, modifications, equivalents and variations as fall within the spirit and broad scope of the appended claims.

Method embodiments described herein may be computer-implemented. Some embodiments may include computer-readable media encoded with a computer program (e.g., software), which includes instructions operable to cause an electronic device to perform methods of various embodiments. A software implementation (or method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMS), read only memories (ROMs), and the like.

In the foregoing description of various embodiments, reference is made to the accompanying drawings, which form a part hereof and show, by way of illustration, specific embodiments that may be practiced. Various embodiments are described in sufficient detail to enable those skilled in the art to practice such embodiments, and it is to be understood that other embodiments may be utilized, and that process or mechanical changes may be made, without departing from the scope of the application.

Embodiments may be referred to, individually and/or collectively, herein by the term "inventive subject matter" merely for convenience and without intending to voluntarily limit the scope of this application to any single inventive subject matter or inventive concept if more than one is, in fact, disclosed. It will be recognized that the methods of various embodiments can be combined in practice, either concurrently or in succession. Various permutations and combinations may be readily apparent to those skilled in the art.

What is claimed is:

1. A method comprising:
   using one or more processors to perform the following acts:
      accessing a take amount related to a current transaction in which a first user participated, the take amount being revenue generated by a sales facilitator in association with the current transaction;
      accessing feedback associated with the first user and accumulated from feedback submitted by at least one other user associated with the current transaction and a user community;
      determining whether the first user's feedback is positive feedback or negative feedback;
      accessing a first total take amount accumulated from one or more take amounts in a selection of other transactions in which the first user participated;
      accessing a first total positive take amount accumulated from take amounts associated with positive feedback in the selection of other transactions in which the first user participated;
      accumulating the take amount with the first total take amount to calculate a second total take amount;
      accumulating the take amount with the first total positive take amount to calculate a second total positive take amount when the first user's feedback is positive feedback;
      adjusting reputation information associated with the first user based on the first user's feedback, wherein a positive adjustment is made when the first user's feedback is positive feedback and a negative adjustment is made when the first user's feedback is negative feedback; and
      providing, to the user community, the first user's reputation information, including the second total positive take amount and the second total take amount.

2. The method of claim 1, wherein determining the take amount related to the transaction comprises:
   accessing a listing fee associated with the transaction;
   accessing a commission charge associated with the transaction; and
   determining the take amount by combining one or more of the listing fee or the commission charge.

3. The method of claim 1, wherein accumulating the take amount with the first total take amount comprises using a first weighted function to calculate the second total take amount.

4. The method of claim 3, wherein the first weighted function uses one or more parameters.

5. The method of claim 4 wherein the parameters are related to one or more of time, product origin, or number of transactions.

6. The method of claim 1, wherein accumulating the take amount with the first total positive take amount when the feedback is positive feedback comprises using a second weighted function to calculate the second total positive take amount.

7. The method of claim 6 wherein the second weighted function uses one or more parameters.

8. The method of claim 7, wherein the parameters are related to one or more of time, product origin, or number of transactions.

9. The method of claim 1, wherein including the second total positive take amount in the first user's reputation information comprises using the second total positive take amount to determine a reputation.

10. The method of claim 9, wherein using the second total positive take amount to determine the reputation comprises:
   determining a percent of positive take by dividing the second total positive take amount by the second total take amount; and
   determining the reputation as a function of the percent of positive take.

11. The method of claim 9, wherein using the second total positive take amount to determine the reputation is performed after payment of the take amount has been confirmed or received.

12. The method of claim 1, wherein including the second total positive take amount in the first user's reputation information comprises providing a ratio of the second total positive take amount compared to the second total take amount to the user community.

13. A system comprising:
   a storage device storing data related to a current transaction;
   a control device communicatively coupled to the storage device and configured to:
   access a take amount related to the current transaction in which a first user participated, the take amount being revenue generated by a sales facilitator in association with the current transaction;
   access feedback associated with the first user and accumulated from feedback submitted by at least one other user associated with the current transaction and a user community;
   determine whether the first user's feedback is positive feedback or negative feedback;
   access a first total take amount accumulated from one or more take amounts in a selection of other transactions in which the first user participated;
   access a first total positive take amount accumulated from take amounts associated with positive feedback in the selection of other transactions in which the first user participated;
   accumulate the take amount with the first total take amount to produce a second total take amount;
   accumulate the take amount with the first total positive take amount to produce a second total positive take amount when the first user's feedback is positive feedback;

adjust reputation information associated with the first user based on the first user's feedback, wherein a positive adjustment is made when the first user's feedback is positive feedback and a negative adjustment is made when the first user's feedback is negative feedback; and provide, to the user community, the first user's reputation information, including the second total positive take amount and the second total take amount.

14. The system of claim 13, wherein the control device is further adapted to determine the take amount by:

accessing a listing fee associated with the transaction;

accessing a commission charge associated with the transaction; and determining the take amount by combining one or more of the listing fee or the commission charge.

15. The system of claim 13, wherein the control device is further adapted to accumulate the take amount with the first total take amount using a first weighted function to calculate the second total take amount.

16. The system of claim 13, wherein the control device is further adapted to accumulate the take amount with the first total positive take amount using a second weighted function to calculate the second total positive take amount when the first user's feedback is positive feedback.

17. The system of claim 13, wherein the control device is further adapted to include the second total positive take amount in the first user's reputation information by:

using the second total positive take amount to determine a reputation.

18. The system of claim 13, wherein the control device is further adapted to use the second total positive take amount to:

determine a percent of positive take by dividing the second total positive take amount by the second total take amount; and determine the reputation as a function of the percent of positive take.

19. The system of claim 13, wherein the control device is further adapted to use the second total positive take amount to determine a reputation after payment of the take amount has been confirmed or received.

20. An apparatus comprising:

means for accessing a take amount related to a current transaction in which a first user participated, the take amount being revenue generated by a sales facilitator in association with the current transaction;

means for accessing feedback associated with the first user and accumulated from feedback submitted by at least one other user associated with the current transaction and a user community;

means for determining whether the first user's feedback is positive feedback or negative feedback;

means for accessing a first total take amount accumulated from one or more take amounts in a selection of other transactions in which the first user participated;

means for accessing a first total positive take amount accumulated from take amounts associated with positive feedback in the selection of other transactions in which the first user participated;

means for accumulating the take amount with the first total take amount to produce a second total take amount;

means for accumulating the take amount with the first total positive take amount to produce a second total positive take amount when the first user's feedback is positive feedback;

means for adjusting reputation information associated with the first user based on the first user's feedback, wherein a positive adjustment is made when the first user's feedback is positive feedback and a negative adjustment is made when the first user's feedback is negative feedback; and means for providing, to the user community, the first user's reputation information, including the second total positive take amount and the second total take amount.

21. The apparatus of claim 20, wherein the means for including the second total positive take amount in the first user's reputation information includes:

means for using the second total positive take amount to determine a reputation.

22. A non-transitory, tangible computer-readable storage medium including instructions that, when executed on a processor, cause the machine to perform a method comprising:

accessing a take amount related to a current transaction in which a first user participated, the take amount being revenue generated by a sales facilitator in association with the current transaction;

accessing feedback associated with the first user and accumulated from feedback submitted by at least one other user associated with the current transaction and a user community;

determining whether the first user's feedback is positive feedback or negative feedback;

accessing a first total take amount accumulated from one or more take amounts in a selection of other transactions in which the first user participated;

accessing a first total positive take amount accumulated from take amounts associated with positive feedback in the selection of other transactions in which the first user participated;

accumulating the take amount with the first total take amount to calculate a second total take amount;

accumulating the take amount with the first total positive take amount to calculate a second total positive take amount when the first user's feedback is positive feedback;

adjusting reputation information associated with the first user based on the first user's feedback, wherein a positive adjustment is made when the first user's feedback is positive feedback and a negative adjustment is made when the first user's feedback is negative feedback; and providing, to the user community, the first user's reputation information, including the second total positive take amount and the second total take amount.

* * * * *